United States Patent [19]
Liard

[11] 3,833,238
[45] Sept. 3, 1974

[54] SAFETY BELT SYSTEM
[76] Inventor: Maurice Liard, 276 DeSalaberry, Joliette, Quebec, Canada
[22] Filed: Sept. 27, 1972
[21] Appl. No.: 292,717

[52] U.S. Cl. .......................................... 280/150 SB
[51] Int. Cl. ............................................. B60r 21/02
[58] Field of Search ............................... 280/150 SB

[56] References Cited
UNITED STATES PATENTS

| | | | |
|---|---|---|---|
| 3,411,602 | 11/1968 | Royce | 280/150 SB |
| 3,583,726 | 6/1971 | Lindblad | 280/150 SB |
| 3,680,883 | 8/1972 | Keppel | 280/150 SB |
| 3,694,002 | 9/1972 | Fancy | 280/150 SB |

Primary Examiner—Leo Friaglia
Assistant Examiner—Randall A. Schrecengost

[57] ABSTRACT

There is disclosed a safety belt wound on a spring reel at the aft end of the door, which keeps the belt under tension, and blocked by a clamping device when the door is closed, to ensure wear of the belt and effect its locking automatically. The blocking device comprises elements which come in contact when the door is shut and clamp the belt therebetween.

5 Claims, 7 Drawing Figures

SAFETY BELT SYSTEM

The present invention relates to a safety belt system for automotive vehicles and applies both to seat belts which encircle the driver's or passenger's waist and to harness belts which are disposed diagonally across the chest. The system according to the present invention can be used for vehicles having forehinged doors and seats adjacent the door, which includes practically all cars and trucks of current construction.

Safety belts have proved to be very effective in reducing injury in the case of accidents and they are required by law in most localities. They are only effective, however, if they are used, and it has been found that a large proportion of drivers and passengers do not bother to buckle their belts in spite of the wide publicity recommending their use. While enforcement of laws requiring the presence of safety belts is practical, it is difficult to enforce laws requiring the actual use thereof.

A number of belt systems have been proposed, in which the belt is installed automatically upon closing of the door. While these systems ensure that the belt is actually worn, they have the drawback of being complex and consequently expensive and easily broken down. The conventional systems also require considerable alteration of the door structure and are therefore difficult to install.

It is an object of the present invention to provide a belt system which positions and locks itself automatically upon closing the door and which is simple in construction and easy to install.

The invention accordingly provides a safety belt for a vehicle with a fore hinged door and a seat adjacent the door, comprising a belt having one end fastened to the vehicle on the side of the seat remote from the door, a reel on which the other end of the belt is wound, the reel being connected to the door, automatic winding means associated with the reel to keep tension on the belt, and blocking means connected to the aft end of the door and to the adjacent portion of the vehicle, adapted to jam the belt upon closing the door.

This arrangement avoids the complex leverage which was thought necessary in some of the prior constructions to move the belt out of the user's way when entering the vehicle, since the user can easily slide in under the belt when entering the vehicle and move the belt out of the way with his body. The locking device is strickly mechanical and obviates the need for locking devices actuated upon closing of the ignition circuit, as in some conventional system.

Further according to the invention the automatic winding means comprises a torsion spring connected to the reel.

Still according to the invention the blocking means comprises a guide at the aft end of the door over which the belt runs and a catch connected to the vehicle and engageable with the guide.

Still according to the invention the catch is engageable with the fore side of the guide and a spring actuated pivotable latch is mounted on the door forward of the guide, the latch being engageable with the fore side of the catch, to provide for positive jamming of the belt.

Further according to the invention the reel, guide and latch are interconnected as a unit to facilitate installation of the blocking device, and the unit is removably connected to the door.

A preferred embodiment of the invention is illustrated by way of example in the accompanying drawings, in which FIG. 1 is a fragmentary perspective view of a vehicle with the safety belt system according to the invention installed therein.

Figure 1:
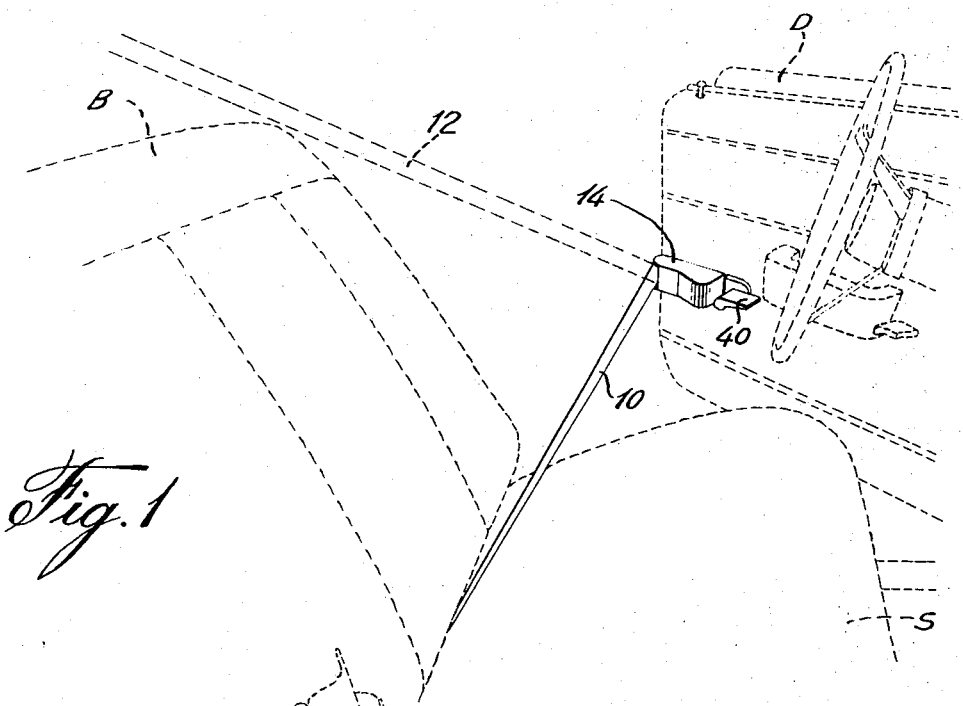
Figure 2:
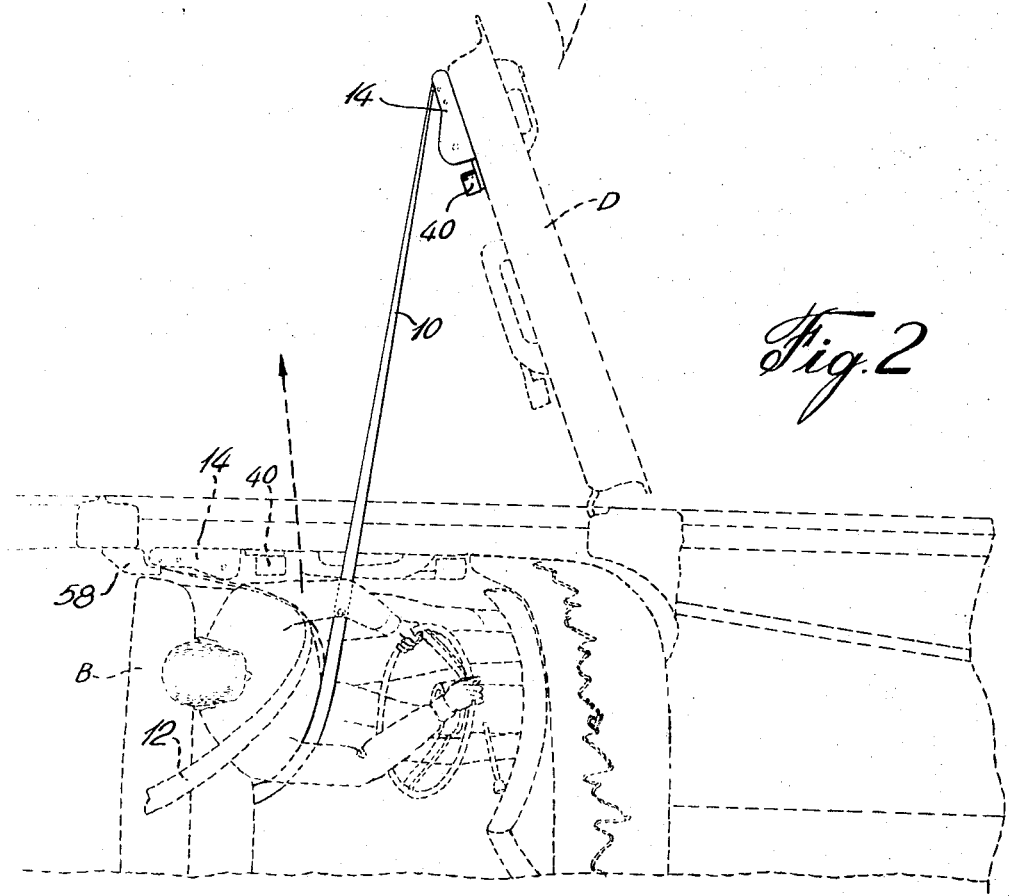
FIG. 2 is a fragmentary top view of the vehicle and belt system with the vehicle door open.
Figure 3:
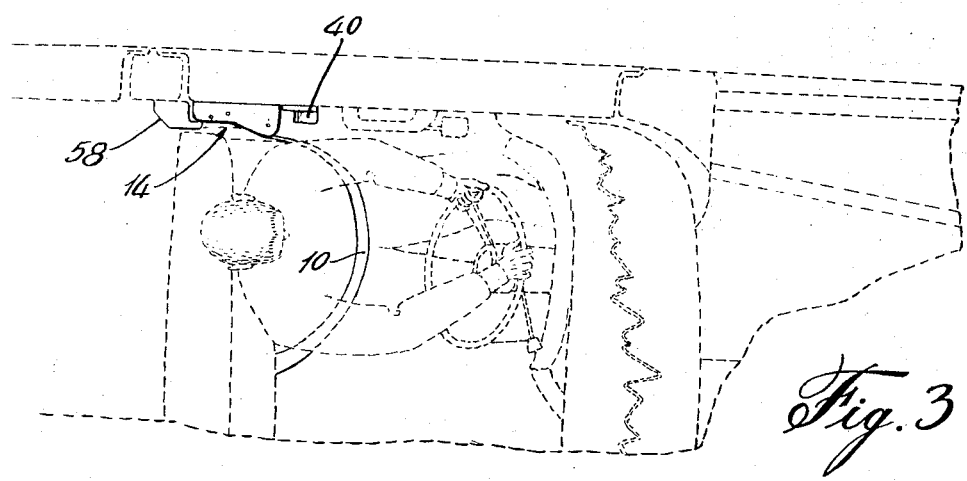
FIG. 3 is a fragmentary top view of the vehicle and belt system with the door closed.

As illustrated in FIGS. 1 to 3, the safety belt system according to the invention comprises a belt 10 whose inner end passes between the seat S and the back B and is attached to the vehicle floor in any convenient manner. If desired, an additional belt 12 may be connected to belt 10 with its inner end attached to the vehicle roof to form a chest and shoulder harness. Alternatively only belt 12 may be provided and seat belt 10 may be omitted altogether.

At its outer end the belt 10 is connected to a reeling and clamping unit 14 attached to the aft end of the inner wall of door D which is fore hinged as is costumary. Unit 14 is disposed approximately at seat level.

Figure 4:
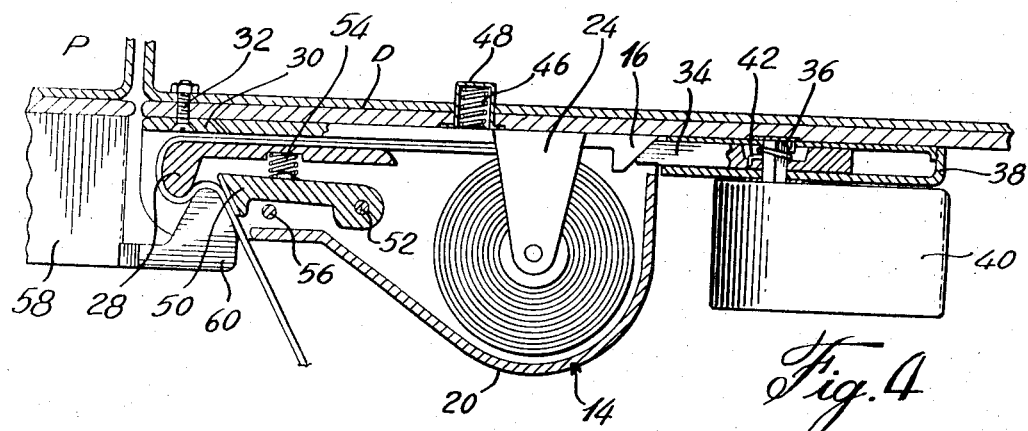
FIG. 4 is a horizontal section of the reeling and blocking part of the system with adjacent portions of the vehicle door and frame, showing the device in blocked position with the door shut.
Figure 5:
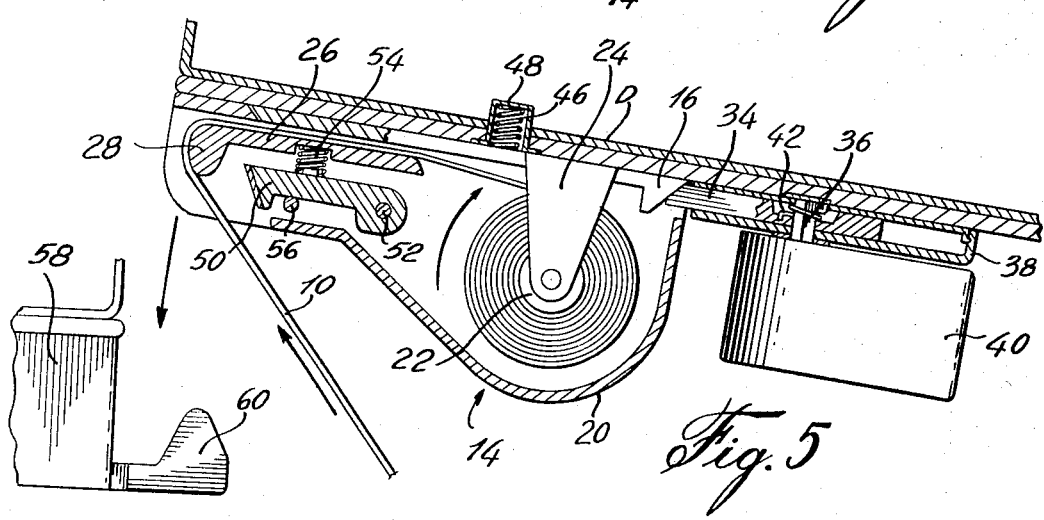
FIG. 5 is a view similar to FIG. 4, showing the device in free position with the door partly open.
Figure 7:
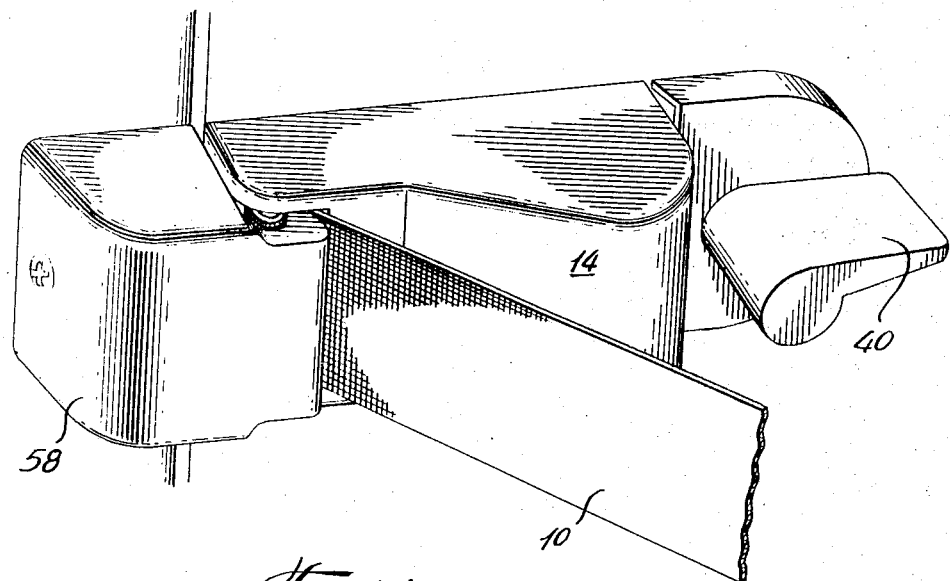
FIG. 7 is a perspective view of the reeling and blocking part of the system in blocked position.
Figure 6:
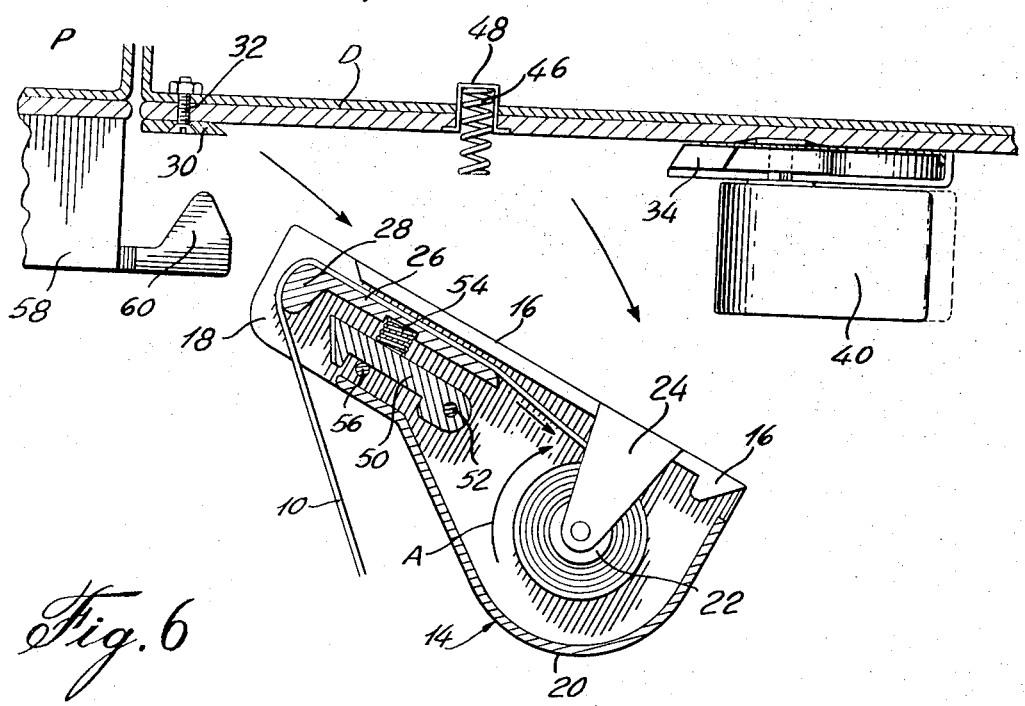
FIG. 6 is a view similar to FIG. 4, showing the device removed from the door.

As shown in FIGS. 4–5 and 6 the unit 14 comprises a base plate 16 side walls 18 and top 20 forming a casing for the unit. Inside the casing a reel 22 is rotatably mounted on a pair of opposite brackets 24. Reel 22 has a torsion spring (not visible) mounted in the interior thereof which urges the reel 22 in the direction of arrow A. Reel 22 is mounted at the fore end of the casing of unit 14 and walls 18 and top 20 af the casing are shaped to accomodate it.

Aft of the casing a guide 26 is rigidly mounted between the side walls 18. Guide 26 is spaced from and parallel to the base plate 16 and has an enlarged rounded portion 28 at its aft end. Belt 10 passes around the portion 28, between guide 26 and base plate 16 and is wound on the reel 22.

The aft end of base plate 16 is bevelled and fits under an oppositely bevelled bracket 30 secured at the edge of the door D by bolts 32. The fore end of plate 16 is likewise bevelled and is engaged by an oppositely bevelled lever 34 mounted on a square shaft 36 pivoted in the interior of a casing 38 fastened to the door. Shaft 36 has a handle 40 mounted thereon outside casing 38; a torsion spring 42 inside the casing 38 and surrounding shaft 36 urges the lever 34 into engagement with the plate 16 of unit 14. Unit 14 is thus securely held on the door but it can be removed if desired by turning handle 40 thereby rotating lever 34 out of engagement with base plate 16. A compression coil spring 46 contained in a socket 48 mounted flush in the door behind base plate 16 acts as an ejector to facilitate removal of the unit 14.

A latch 50 is pivotally mounted inside the casing formed by elements 16, 18 and 20 on a shaft 52 supported by sidewalls 18, adjacent the guide 26. A compression coil spring 54 is disposed between guide 26 and latch 50 and urges the latch 50 away from guide 26 and against a stop pin 56. The aft end of latch 50 and the fore end of enlarged portion 28 of guide 26 are oppositely bevelled to define a wedge-shaped space therebetween.

The door post P of the vehicle has secured to the edge thereof a bracket 58 from which projects forwardly a catch 60 wedge-shaped in horizontal section and positioned to enter the aforementioned space between guide postion 28 and latch 50 in the closed position of the door as shown in FIG. 4.

OPERATION

When the door is open as shown in FIG. 5 the belt slides freely over the rounded portion 28 and guide 26 and is kept taut by the spring of reel 22. The driver of the vehicle (or a passenger if the system is provided for the other seats and doors of the vehicle) sits on seat S and in so doing lifts belt 10 and is automatically encircled thereby. Appropriate tension on the belt in maintained during the closing of the door D, and as the same shuts the during the closing of the door D, and as the same shuts the catch 60 jams against portion 28 and latch 50 depressing the latch against the action of spring 54 and jamming the belt as shown in FIG. 4. The belt is thus automatically blocked and holds back the user in case of accident.

I claim:

1. Safety belt system for a vehicle with fore hinged door and a seat adjacent the door, comprising
    a belt having one end fastened to the vehicle on the side of the seat remote from the door,
    a reel on which the other end of said belt is wound, said reel being connected to the door adjacent the aft end thereof,
    automatic winding means associated with said reel to keep tension on said belt,
    and first blocking means connected to the aft end of the door and underlying a portion of said belt, second blocking means connected to the adjacent portion of the vehicle and adapted to jam said belt against said first blocking means upon closing of said door.

2. Safety belt system according to claim 1, wherein said automtic winding means comprises a torsion spring connected to said reel.

3. Safety belt system according to claim 2, wherein said first blocking means comprises a guide at the aft end of the door over which said belt runs and said second blocking means comprising a catch connected to the vehicle and engageable with said guide.

4. Safety belt system according to claim 3, wherein said catch is engageable with the foreside of said guide and a spring actuated pivotable latch is mounted on the door forward of said guide, said latch being engageable with the foreside of said catch.

5. Safety belt system according to claim 4, wherein said reel, said guide and said latch are interconnected as a unit removably connected to the door.

* * * * *